United States Patent [19]

Ferrandi

[11] 4,377,328
[45] Mar. 22, 1983

[54] SPECTACLE FRAME

[75] Inventor: Renato Ferrandi, Brescia, Italy

[73] Assignee: European Optics S.p.A., Brescia, Italy

[21] Appl. No.: 267,574

[22] Filed: May 27, 1981

[30] Foreign Application Priority Data

Mar. 31, 1981 [IT] Italy .............................. 21344/81[U]

[51] Int. Cl.³ .......................... G02C 5/16; G02C 5/06
[52] U.S. Cl. .................................... 351/126; 351/113; 351/114
[58] Field of Search ....................... 351/113, 114, 126; 2/448, 449, 450

[56] References Cited

U.S. PATENT DOCUMENTS

| | | |
|---|---|---|
| 808,412 | 12/1905 | Ward . |
| 1,001,734 | 8/1911 | Day . |
| 1,082,480 | 12/1913 | Cutler . |
| 1,129,950 | 3/1915 | Brennecke . |
| 1,180,701 | 4/1916 | Day . |
| 1,210,038 | 12/1916 | Brennecke . |
| 1,663,402 | 10/1925 | Engel . |
| 3,813,152 | 5/1974 | Hampel .............................. 351/153 |

FOREIGN PATENT DOCUMENTS

| | | |
|---|---|---|
| 631880 | 1/1962 | Italy . |
| 84231 | 2/1957 | Netherlands . |
| 368640 | 5/1963 | Sweden . |
| 456668 | 11/1936 | United Kingdom . |

Primary Examiner—John K. Corbin
Assistant Examiner—Rodney Bovernick
Attorney, Agent, or Firm—Armstrong, Nikaido, Marmelstein & Kubovcik

[57] ABSTRACT

This invention concerns a frame for spectacles comprising one or more flexible elements fitted between parts of the front and of the sides, in order to make the frame itself highly adaptable to the anatomy of the face; said flexible elements comprise a helical spring and two pins, one end of which engages with said spring whereas the opposite end is secured to said parts of the front and of the sides; the threaded ends of said pins are equal in diameter to the internal diameter of said spring and have a pitch equal to the pitch of the coils of said spring, while their combined length is less than the length of said spring.

5 Claims, 5 Drawing Figures

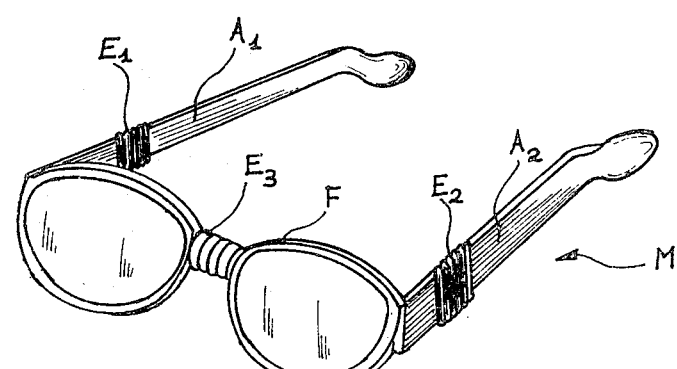
Fig_1
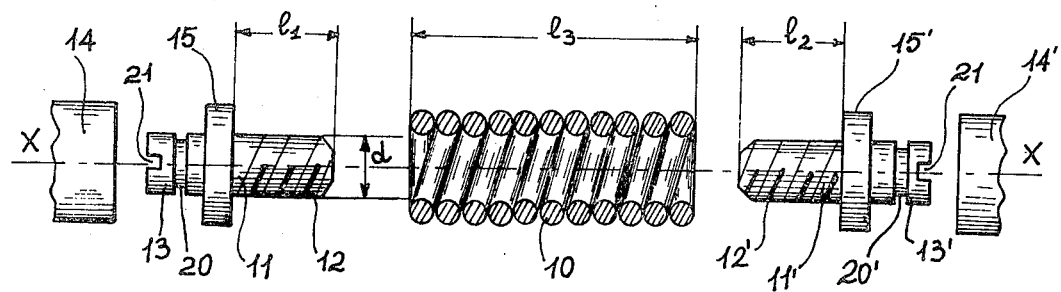
Fig_2
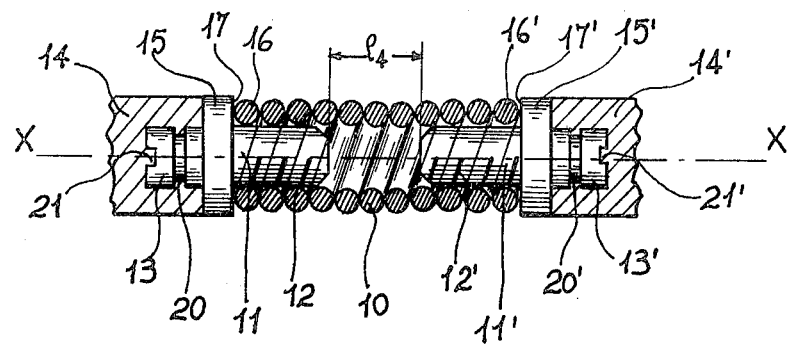
Fig_3

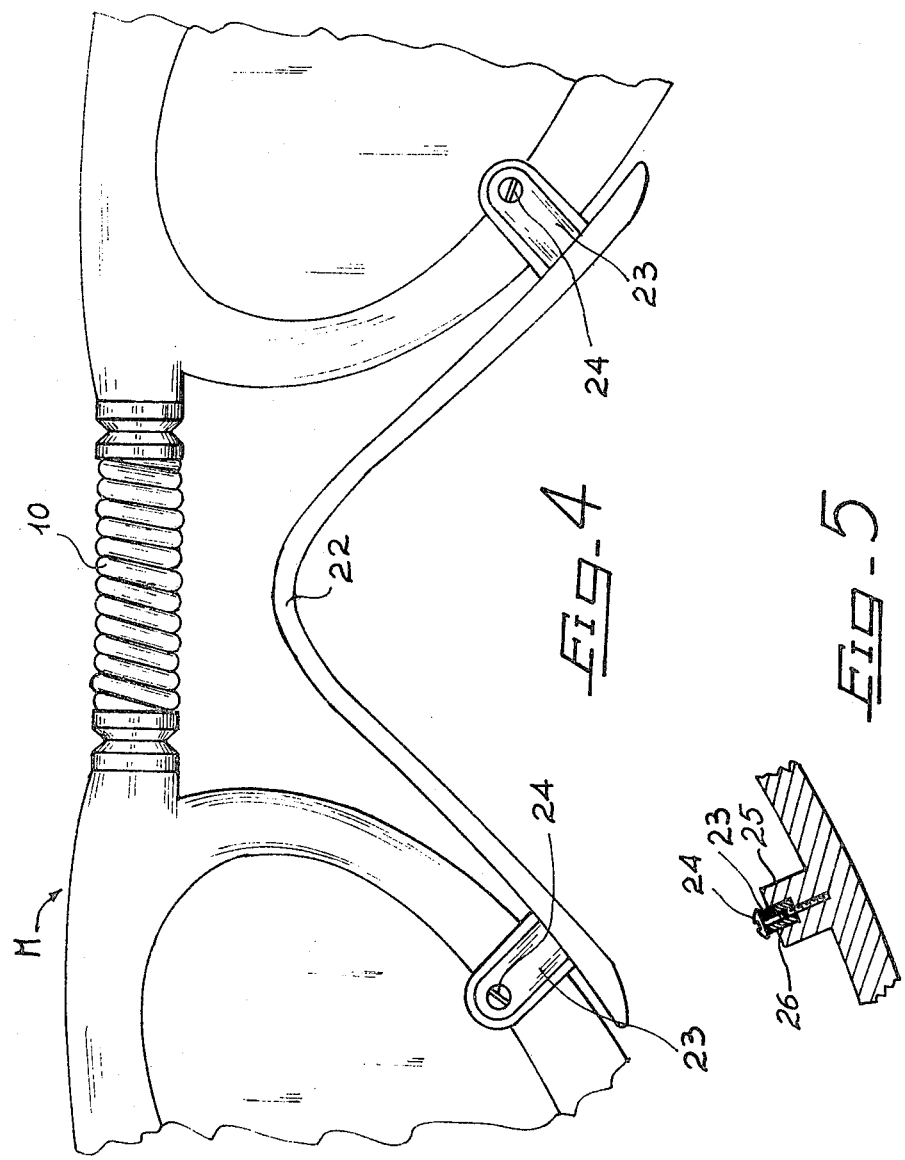

SPECTACLE FRAME

FIELD OF THE INVENTION

As experts in the field are aware, one of the problems encountered in manufacturing spectacles concerns the characteristics of the frame, which must possess the maximum capacity to adapt to the anatomy of the face, which differs slightly from one person to another. For this purpose, a number of solutions have been devised, which consist mainly in inserting flexible elements into the frame itself at certain points in the fronts and sides.

With regard to the sides, one of the most advanced solutions of the prior art consists in fitting a particular chain of articulated elements into a section of each side.

The chain comprises a plurality of small adjacent blocks, each of which presents two opposing faces with curve-shaped surfaces designed to move with curved surfaces of the respective opposing faces in order to allow the passage of the distortable core of the side (usually a metal strip which extends along the entire length of the side and is sunken into the plastic which constitutes the side itself).

The possibility of a slight amount of reciprocal sliding of the aforementioned small blocks in the articulated chain gives the side a certain amount of flexibility in the section in which the articulated chain itself is inserted. By suitably shaping the curved surfaces, it is possible to give the side a certain flexibility with respect to any plane crossing the axis of the side itself and, at the same time, to allow the free end of the side a certain amount of rotation with respect to the other end of the side which is hinged onto the front of the frame.

The described solution is not however free from problems. The first problem consists in the possibility of small impurities becoming lodged in between the opposing faces of adjacent blocks, preventing or hindering or, in any case, causing irregular and uneven reciprocal sliding of the blocks themselves. This is a problem which cannot be disregarded, due to the fact that the proper functioning of the side depends precisely upon the possibility of the blocks to slide together as smoothly and as evenly as possible and, therefore, upon the total absence of foreign bodies between the sliding surfaces; and neither is it an unlikely problem, insofar as the sides are unavoidably in contact with the hair, hairs, dandruff and other minute fine impurities. On the other hand, it should be noted that even the movement of the blocks, by means of a dragging motion, can cause the impurities deposited on the sides to enter between the sliding surfaces.

The second problem is represented by the technical difficulties which must be overcome, both with regard to the assembling of the flexible elements onto the frame (assembling which must necessarily be carried out in compliance with a pre-established sequence of different blocks), and also with regard to the manufacture of the blocks themselves, insofar as the opposing faces of adjacent blocks must be shaped into curved surfaces which match one another perfectly.

With regard to the rims, the solution of the known technique consists in cutting the bridge between the rim and inserting a flexible element; said flexible element usually consists of a fine flat spring, secured at both ends to the two parts into which the front has been divided. This very simple solution however has the inconvenience of only giving flexibility to the rims or, in the sense of allowing the front to be narrowed or widened with respect to the face, that is to say, only according to the bending capacity of the flat spring. Therefore, relative movements of the two parts into which the front is divided are not possible; for example, it is not possible for one part of the front, fitted with a lens, to be placed higher or lower with respect to the other part of the front which contains the other lens. And this, obviously, prevents the frame from being adjusted, as would be desirable, to the particular anatomy of the face of each individual.

SUMMARY OF THE INVENTION

The aim of this invention is that of providing a spectacle frame which is free from the aforementioned problems of the known technique. In particular, this invention concerns a spectacle frame comprising one or more flexible elements interposed between parts of the front or rims and in the sides or temple pieces, in which each of said flexible elements comprises a helical spring and a first and a second pin having one threaded end equal in diameter to the internal diameter of said spring and with a pitch equal to the pitch of the coils of said spring, said first and second pin being engaged at said threaded ends with said spring and being secured at the opposite ends to said parts of the front and of the sides, the combined length of the threaded ends of said first and second pins being less than the length of said spring.

This invention will be more clearly illustrated by means of the detailed description of the figures in the annexed drawing sheets.

BRIEF DESCRIPTION OF THE DRAWINGS

FIG. 1 shows an overall view of the spectacle frame fitted with the flexible elements of this invention;

FIG. 2 shows an exploded view of the components in a preferred embodiment of the flexible elements of the spectacle frame of this invention;

FIG. 3 shows a view similar to FIG. 2 with the components assembled;

FIG. 4 shows an internal view of a frame fitted with a flexible nose-piece;

FIG. 5 shows a detail of the nose-piece of FIG. 4.

DESCRIPTION OF THE PREFERRED EMBODIMENTS

With reference to FIG. 1, the latter shows a spectacle frame M, provided on the front or rims F and with temple or side pieces $A_1$ and $A_2$ respectively, with the flexible elements $E_3$, $E_1$ and $E_2$ of this invention. The frame M is thus flexible both in correspondence with the front and with the sides.

Moreover, it is obvious that said flexible elements may be fitted just on the front or just on the sides, according to specific requirements.

FIG. 2 shows the components of each said flexible element, disassembled and arranged along the axis of symmetry X—X. Each flexible element comprises a helical spring 10, and a first and second pin 11 and 11'. The characteristics of the spring 10 (length, pitch of the coils, internal and external diameter, elasticity, etc.) are determined each time, according to the specific case to which this invention is applied.

The first and second pin 11 and 11' present threaded ends, 12 and 12' respectively, pointing towards the helical spring 10 and, on the opposite part, ends 13 and 13', pointing towards the parts 14 and 14' of the frame M, parts which may belong either to the front or to the sides. The ends 12 and 13 of the pin 11 and the ends 12' and 13' of the pin 11' are separated from one another by annular protrusions, indicated respectively by 15 and 15', whereas the ends 13 and 13' of each pin are provided with annular grooves 20 and 20' which will be hereinafter described in greater detail.

The ends 12 and 12' of said first and second pin 11 and 11' present a diameter d which is equal to the internal diameter of said helical spring 10 and a pitch substantially equal to the pitch of the coils of the spring itself.

The pitch of the screw is preferably chosen a few tenths of a millimeter wider than the pitch of the coils. The pins 11 and 11' can thus engage, by means of their threaded ends, with the spring 10 from opposing ends of the latter. For this purpose, slots 21 and 21' have been cut on the heads of the ends 13 and 13' for receiving the point of a tool such as, for example, a screwdriver or similar tool.

The length $l_1$ of the threaded end 12 and the length $l_2$ of the end 12' can either be equal or can differ from each other; however, for the purpose of this invention, the sum of said lengths $l_1$ and $l_2$ must be less than the length $l_3$ of the spring 10. The ends 13 and 13' of said pins, opposite the threaded ends 12 and 12', on the contrary, must be secured to the parts 14 and 14' of the frame M.

FIG. 3 shows the various components of FIG. 2 assembled to form the flexible element to be inserted in the spectacle frame of this invention.

The assembling of said components can be carried out in the following way.

The first and second pins 11 and 11' are made to engage, by means of the respective threaded ends 12 and 12', with the spring until the external coils of said spring, 16 and 16' respectively, come to rest against the annular surfaces 17 and 17' respectively of said protrusions 15 and 15'. The ends 13 and 13' of the first and second pin are then secured to the parts 14 and 14' of the frame, that is to say, to parts of the front or of the sides. This can be carried out in a number of ways which are known in themselves; as the frame is generally made of plastic, said ends are usually sunken into the plastic itself during the moulding.

Due to the presence of the annular grooves 20 and 20' respectively on the ends 13 and 13' of the pins 11 and 11', the pins themselves remain firmly anchored to the parts 14 and 14' of the frame M when the latter, in cooling, hardens thereby preventing further rotation of the pins with respect to the rim.

As the length $l_3$ of the spring 10 is greater than the sum of the lengths $l_1$ and $l_2$ of the threaded ends of said first and second pin 11 and 11', it is obvious that when the various components of the flexible element have been assembled as in FIG. 3, there will be a section of the spring measuring $l_4$ not engaged with the pins. The spring can bend freely in this section, thus ensuring the required amount of flexibility to the front F and to the sides $A_1$ and $A_2$. Naturally, the various values of the lengths $l_1$, $l_2$ and $l_3$, which determine the length $l_4$ of the free section of the spring, must be established, together with the other mechanical parameters of the spring itself, according to the desired functional and aesthetical characteristics of the frame.

With particular reference to FIG. 4 and FIG. 5, according to a preferred embodiment of this invention, the frame M can be provided with a flexible nose-piece 22, made, for example, from soft PVC and fitted with metal eyelets 23 arranged symmetrically on the two opposing sides of the nose-piece 22. The eyelets 23 are designed to be fixed, by means of self-tapping screws 24, to the frame M of the spectacles. For this purpose, protrusions 25 are provided on the frame M, on an area of which cavities 26 are defined in order to house the respective eyelets 23 of the flexible nose-piece 22.

It is clear from all that heretofore described and illustrated that the advantages of the spectacle frame of this invention with respect to that already known, derive from the adoption of a helical spring and two pins constituting the flexible elements to be inserted into the front and into the frame. These advantages consist mainly of a high degree of adaptability of the frame to the anatomy of any face whatsoever and in greater simplicity in manufacturing and assembling the components of the flexible elements.

Firstly, the helical spring makes it possible to achieve the same results as in the known technique (flexure of the front and of the sides with respect to any plane crossing the axis of the latter, rotation of the free end of the side with respect to the end hinged to the front, etc.), without however resorting to delicate articulated mechanisms; moreover, unlike the known technique, it permits relative movement of the parts into which the front is divided, in all directions, and not only in the sense of giving the front itself a greater or smaller curvature or camber.

This latter detail proves to be extremely important as the problems relating to the different calibration of the spectacles are thereby eliminated. As it is known, in fact, each model of spectacles is supplied to the optician in at least three different measurements in order to adapt to the anatomical conformation of the faces of different persons, especially with regard to the shape of the nose. With the spectacle frame of this invention, on the contrary, these problems do not exist as it can bend according to a plane which is substantially complanate with that of the lenses and, therefore, adapt with the greatest of ease, even to rather pronounced noses.

Secondly, there are no reciprocally moving parts which therefore excludes any possibility of problems deriving from the intrusion of impurities between sliding surfaces; thus, the bending movements of the frame always result smooth and easy.

A further advantage consists in the possibility of utilizing a single type of flexible element (providing it is of a suitable size which is, on the other hand, obvious to technicians in the field) both for the front and also for the sides. Lastly, the flexible element described herein, besides being extremely simple to manufacture, is extremely easily and quickly assembled and fitted onto the frame.

Having described merely one embodiment of the frame of this invention, all the possible variations available to technicians in the field are understood as included within its sphere of protection.

In particular, the above-described flexible element may also be very advantageously applied to metal frames, the technician having to use the sole precaution of suitably adapting the ends 13 and 13' of the pins 11 and 11' in order to be able to weld them in pre-determined points of the metal frame.

What is claimed is:
1. A spectacle frame comprising:
 (a) first and second rim portions for holding lenses therein;
 (b) first and second pin means, said first and second pin means each having an embedded end portion completely and fixedly embedded in a correspond- ing one of said first and second rim portions, and having an extending portion extending from said corresponding first and second rim portions, said extending portions having screw threads thereon;
(c) helical spring means having a length greater than the sum of the lengths of said extending portions, wherein the extending portions of said first and second pin means each threadedly engage a predetermined length of said helical spring means thereby coupling said first and second rim portions together for forming the bridge of said frame, wherein the fixed embedding of said first and second pin means in said rim portions prevents the further relative rotation of said first and second pin means with respect to said rim means of the assembly;
(d) nose piece means mounted on said first and second rim means for supporting said first and second rim means on the nose of a user; and
(e) first and second temple piece means each having one end coupled to a corresponding one of said rim means, said temple piece means being adapted to engage the ears of a user to support the frames thereon.

2. A spectacle frame as set forth in claim 1, wherein each of said first and second pin means includes an annular protruding portion, one side of said annular protruding portion abutting said corresponding rim portion and the other side of said annular protruding portion abutting an end of said helical spring means.

3. A spectacle frame as set forth in any one of claims 1 or 2, wherein each of said first and second pin means includes an annular groove in the end portion thereof, wherein said corresponding rim portion engages said annular groove.

4. A spectacle frame as set forth in claim 3, wherein each of said first and second pin means includes a slot for receiving an assembly tool at the end of said end portion.

5. A spectacle frame as set forth in any one of claims 1 or 2, wherein said first and second temple piece means each include a front portion and a rear portion, a third pin means having an embedded portion in said front portion and an extending portion extending from said front portion, a fourth pin means having an embedded portion in said rear portion and an extending portion extending from said rear portion, and a second helical spring means having a length greater than the length of the sum of the lengths of said extending portions, wherein the extending portions of said third and fourth pin means each threadedly engage said second helical spring means thereby coupling said front and rear portions together.

* * * * *